| (12) | United States Patent | (10) Patent No.: | US 9,039,076 B2 |
|---|---|---|---|
| | Rooijakkers et al. | (45) Date of Patent: | May 26, 2015 |

(54) OPEN ROOF CONSTRUCTION FOR A VEHICLE

(71) Applicant: Inalfa Roof Systems Group B.V., Venray (NL)

(72) Inventors: Alphonsus Theodorus Bernardus Rooijakkers, Venray (NL); Theodorus Gerardus Franciscus Van Rooij, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/062,217

(22) Filed: Oct. 24, 2013

(65) Prior Publication Data

US 2014/0117725 A1 May 1, 2014

(30) Foreign Application Priority Data

Oct. 25, 2012 (EP) .................................... 12189940

(51) Int. Cl.
- *B60J 1/20* (2006.01)
- *B60J 7/057* (2006.01)
- *B60J 7/00* (2006.01)

(52) U.S. Cl.
CPC .............. *B60J 1/2069* (2013.01); *B60J 7/0573* (2013.01); *B60J 7/0015* (2013.01)

(58) Field of Classification Search
CPC ........ B60J 7/057; B60J 7/0573; B60J 7/0015; B60J 1/2069
USPC ..................................... 296/216.01–224, 214
See application file for complete search history.

(56) References Cited

U.S. PATENT DOCUMENTS

| 4,671,564 | A  | * | 6/1987 | Sumida et al. ................ 296/214 |
|---|---|---|---|---|
| 6,481,787 | B1 | * | 11/2002 | Laux et al. .................... 296/214 |
| 6,491,340 | B2 | * | 12/2002 | Hori et al. ..................... 296/214 |
| 6,604,782 | B2 | * | 8/2003 | De Gaillard et al. ..... 296/216.04 |
| 7,025,414 | B2 | * | 4/2006 | Hanke ............................ 296/221 |
| 7,665,793 | B2 | * | 2/2010 | Elbs et al. ..................... 296/97.4 |
| 7,669,919 | B2 | * | 3/2010 | Wingen et al. ................ 296/214 |
| 8,678,488 | B1 | * | 3/2014 | Kim .............................. 296/214 |
| 2002/0145310 | A1 | * | 10/2002 | Schatzler et al. ............. 296/214 |
| 2004/0080189 | A1 | * | 4/2004 | Schatzler et al. ............. 296/214 |
| 2007/0024093 | A1 | * | 2/2007 | Grimm et al. ................ 296/214 |
| 2007/0221339 | A1 | * | 9/2007 | Elbs et al. .................. 160/84.02 |

FOREIGN PATENT DOCUMENTS

| DE | 3509691 | * | 4/1986 |
|---|---|---|---|
| DE | 102008064548 A1 | * | 7/2010 |
| DE | 102010048723 | * | 10/2010 |

* cited by examiner

*Primary Examiner* — Dennis H Pedder
(74) *Attorney, Agent, or Firm* — Steven M. Koehler; Westman, Champlin & Koehler, P.A.

(57) ABSTRACT

Open roof construction for a vehicle is provided, comprising a roof opening provided in a stationary roof part of the vehicle and movable means for opening and closing the roof opening. At least a first and second drive member are provided for cooperation with the movable means, which at least first and second drive member are movable in a direction of the vehicle by a common drive source and are spaced in said direction. At least one elongate buckling resistant member is provided extending substantially in said direction and movable between a disconnect position in which the first and second drive members of the movable means are operatively disconnected and a connect position for operatively connecting the first and second drive members of the movable means.

20 Claims, 9 Drawing Sheets

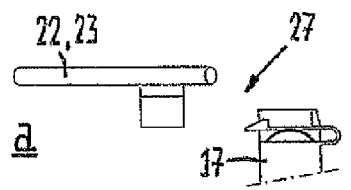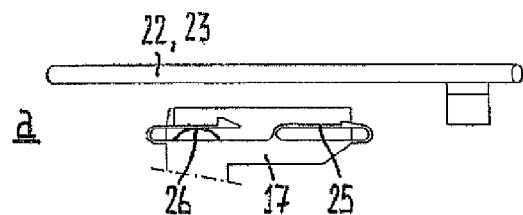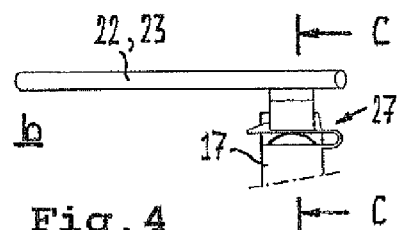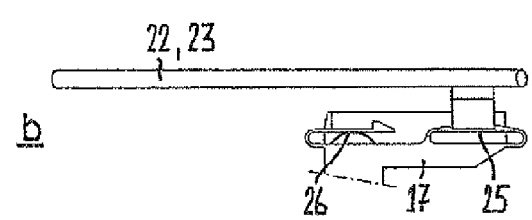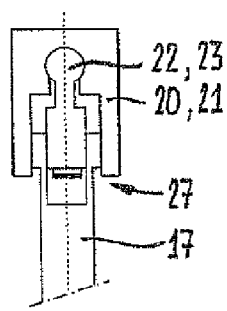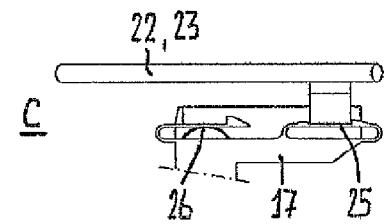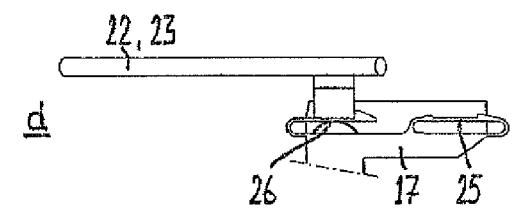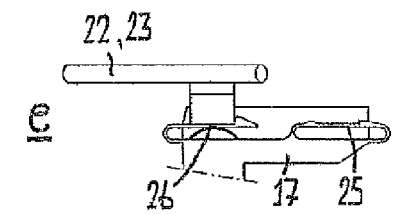
Fig.4
Fig.5
Fig.6

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening provided in a stationary roof part of the vehicle and movable means for opening and closing the roof opening, wherein at least a first and second drive member are provided for cooperation with the movable means, which at least first and second drive member are movable in a direction of the vehicle by a common drive source and are spaced in said direction. Said direction generally will be a longitudinal or transverse direction of the vehicle.

When state of the art vehicles are provided with a single large roof opening, it is common to use a single roof module which is provided with an integrated central transverse or longitudinal beam. However, in such a case the rather large dimensions of the roof opening may lead to a decrease of the constructional stability of the vehicle. Thus there is an increasing demand for the use of two roof openings which are separated by a beam which is integrated into the vehicle body. Each roof opening then is provided with its own roof module (although it is conceivable that these roof modules are connected to each other).

Generally such roof modules will be mounted into the respective roof opening in a vertical direction, such that it is not possible to have parts of said roof modules positioned underneath (for top loaded modules) or above (for bottom loaded modules) the stationary roof part or beam. This results in a situation in which, because of the presence of the beam, it is very difficult to use the drive source of the first module for also driving the drive member of the second roof module. Only by means of complicated measures such a drive connection between the first and second roof modules might be obtained.

The above problems also may arise with open roof constructions comprising constructional parts projecting into the roof opening and thus hindering or even preventing such a mounting in a vertical direction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction for a vehicle is provided which includes at least one elongate buckling resistant member extending substantially in said direction and movable between a disconnect position in which the first and second drive members of the movable means are operatively disconnected and a connect position for operatively connecting the first and second drive members of the movable means.

The use of such an elongate buckling resistant member allows use of the drive source of the first drive member also to be used for driving the second drive member with less complicated measures. The buckling resistant nature of the elongate buckling resistant member allows to bridge the distance between the drive members (and across any constructional part, such as for example a beam, if provided) without any additional measures. This would not be possible with a standard push-pull cable.

It is possible, that the movable means comprise separate first and second movable members cooperating with the first and second drive members, respectively, for example roof panels. However, it is conceivable too, that the movable means comprise a single movable member (such as a roof panel) cooperating with both the first and second drive members. Each movable member may comprise, for example, a roof panel, rollo sunshade, a wind deflector, glass panel or any other movable member commonly applied in an open roof construction.

In one embodiment of the open roof construction, the roof opening is provided with at least one constructional part positioned between the first and second drive members with first and second roof modules at opposite sides of said constructional part, as seen in said direction of the vehicle, wherein the elongate buckling resistant member in an operative position of the open roof construction extends in said direction fully across said constructional part.

Such an embodiment, not withstanding the presence of such a constructional part, allows to bridge the distance between the first and second drive members in a straight line. Both modules may be interconnected to form a single part.

In one possible embodiment, said constructional part comprises a beam extending between opposite sides of the roof opening for dividing the roof opening in a first and a second roof opening, wherein the first and second roof openings are provided with said first and second roof modules, respectively, which are provided with said first and second drive members, respectively, for cooperation with the at least one movable member and wherein the first roof module is provided with the drive source for moving its respective drive member, whereas the elongate buckling resistant member in an operative position of the open roof construction extends in said direction fully across the beam and only is supported by the first and second roof modules.

In another possible embodiment, however, the roof opening comprises a beam extending between opposite sides of the roof opening for dividing the roof opening in a first and a second roof opening, wherein the first and second roof openings are provided with said first and second roof modules, respectively, which are provided with said first and second drive members, respectively, for cooperation with the at least one movable member and wherein the first roof module is provided with the drive source for moving its respective drive member, and wherein the constructional part comprises a reinforcement beam provided on the at least one movable member, whereas the elongate buckling resistant member in an operative position of the open roof construction extends in said direction fully across the reinforcement beam.

In yet another possible embodiment, the roof opening comprises a shaped wall defining the said constructional part, wherein said first and second roof modules are provided with said first and second drive members, respectively, for cooperation with the at least one movable member and wherein the first roof module is provided with the drive source for moving its respective drive member, and wherein the elongate buckling resistant member in an operative position of the open roof construction extends longitudinally fully across the shaped wall.

Such a shaped wall, for example a curved wall, may be part of a water guiding provision provided at the inner side of the roof opening. For example, a depression may be made in a plastic and/or metal frame surrounding the roof opening which may act as a water barrier or which may carry a seal member for engaging the movable member.

It is noted that, although two roof modules are mentioned, these also may be connected to form a single unit.

In accordance with another embodiment, in an inoperative, mounting or dismounting position of the open roof construction the at least one elongate buckling resistant member is receivable within one of the first and second roof modules in such a manner that it will not interfere with the respective roof opening during mounting or dismounting.

In the inoperative, mounting or dismounting position of the open roof construction in which the elongate buckling resistant member is received within one of the first and second roof modules, the vertical mounting or dismounting of the roof modules is possible. After mounting the roof modules has been completed, the elongate buckling resistant member is moved to a position in which it extends fully across the constructional part (e.g. transverse or longitudinal beam, reinforcement beam, shaped wall) defining the operative position of the open roof construction in which the drive source not only drives the first drive member, but also the second drive member.

In one embodiment of the open roof construction, the constructional part, for the passage of each elongate buckling resistant member, is provided with a hole with a diameter sufficiently large to prevent contact between the constructional part and the elongate buckling resistant member during normal operation.

Such an embodiment allows to dimension the constructional part in an optimal manner and avoids the generation of friction between it and the elongate buckling resistant member which otherwise would require a higher driving power.

In another embodiment of the open roof construction, however, the position and height of the constructional part are such that the at least one elongate buckling resistant member extends there below or above without engaging it.

In most cases this will lead to a constructional part with a lesser height, and thus this embodiment might not be applicable in cases in which the constructional part (for example a transverse or longitudinal beam) should be capable of withstanding very large forces.

In a practical embodiment of the open roof construction according to the present invention, the drive source of the first roof module comprises two push-pull cables which are connected to the drive member of the first roof module, and which extend each in a respective one of two opposite cable guides of said first roof module, and wherein two elongate buckling resistant members are provided of which, in the operative position of the open roof construction, first ends are received in said cable guides to be engageable by said push-pull cables when said push-pull cables drive said drive member, and of which, in said operative position, second ends are received in respective ones of two opposite guide members for the drive member of the second roof module which extend substantially in line with the cable guides.

When such an embodiment is used, the push-pull cables will engage the elongate buckling resistant members which, as a result, will move the drive member of the second roof module along the guide members.

In such an embodiment it is conceivable that two push-pull cables are provided of which first ends are connected to the drive member of the first roof module, and of which second ends extend each in a respective one of the two opposite cable guides of said first roof module, in such a manner that, when said drive member moves, the first and second ends of a push-pull cable move in opposite directions, and wherein the first ends of the two elongate buckling resistant members, in the operative position of the open roof construction, are received in said cable guides to be engageable by said second ends of the push-pull cables.

Because the first and second ends of said push-pull cables move in opposite directions, the first drive member and second drive member, when driven, also will move in opposite directions, for example for moving two separate movable members which, in a starting position may be located near to a beam and, when driven, move away from said beam and from each other.

In a special embodiment of the open roof construction according to the present invention, the elongate buckling resistant members are disconnectable from the drive member of the second roof module, wherein the opposite cable guides of the first roof module, in an inoperative, mounting or dismounting position of the open roof construction, are able to fully receive the elongate buckling resistant members.

Such an inoperative position of the open roof construction leads to a situation in which the two roof modules are no longer operatively connected through the elongate buckling resistant members and in which there are no parts (especially the elongate buckling resistant members) which protrude too far beyond the outer circumference of said roof modules. As a result, in such a situation vertically mounting (or dismounting) the roof modules into (out of) the respective roof openings can be carried out. Next, when for example such a mounting has been completed, the elongate buckling resistant members again may be moved to a position in which they are operatively connected to the movable member of the second roof module. Therefore, this embodiment makes the mounting and dismounting process very simple.

It is noted, that as a result of such an embodiment there generally will be a certain amount of free play between the movement of the movable member of the first roof module and the movement of the elongate buckling resistant members (and thus the movement of the movable member of the second roof module), such that the movable member of the first roof module will have to be moved a certain distance before the second ends of the push-pull cables will engage the elongate buckling resistant members and the movable member of the second roof module starts moving.

In another embodiment the elongate buckling resistant members are disconnectable from the drive member of the second roof module, wherein the two opposite guide members of the second roof module, in an inoperative, mounting or dismounting position of the open roof construction, are able to fully receive the elongate buckling resistant members.

In such an embodiment the same ease of mounting and dismounting of the roof modules is achieved, but in this case a free play as mentioned above may be prevented, if desired. However, such a free play may be required when the drive members of the roof modules have to travel different distances.

In a further development of the previous embodiment it is possible, that the elongate buckling resistant members are connectable to the drive member of the second module in at least two different positions.

This may be advantageous during the process of operatively connecting the two roof modules, because it allows a favourable manipulation of the elongate buckling resistant members relative to the second drive member.

In one embodiment the facing ends of corresponding ones of the opposite cable guides and opposite guide members of the first and second roof modules, respectively, are flared. As a result introducing the elongate buckling resistant members into the cable guides and guide members is facilitated.

In a practical embodiment the movable means comprises at least one movable roof panel or at least (part of) a rollo. For example, the movable means may comprise pull beams of a rollo assembly connected to a flexible rollo screen which is wound off/on a winding shaft (which may be spring loaded, as is known per se). However, any combination of movable means is possible (they may be similar or may be different). Other movable means comprise a glass panel or a wind deflector.

In another embodiment of the open roof construction according to the present invention, each elongate buckling resistant member comprises a part with reduced diameter which by means of a first hinge member is connected to the remainder of said elongate buckling resistant member and which by means of a second hinge member is connectable to the movable member of the second roof module. This allows to cope with misalignments between the guides and guide members of the roof modules.

Preferably, then, the first and second hinge members define ball hinges, which allow adjustments in all directions.

In a handy embodiment of the open roof construction each elongate buckling resistant member is connectable to a second drive member through snap connections. This reduces the complexity of mounting and dismounting operations.

It is conceivable that, when two roof modules are provided, a first roof module is a forward roof module and a second roof module is a rearward roof module. Both modules may have different dimensions (e.g. a different longitudinal length).

BRIEF DESCRIPTION OF THE DRAWINGS

Hereinafter aspects of the invention will be elucidated while referring to the drawing, in which:

FIG. 4 shows, in two different positions, an embodiment of the connection between an elongate buckling resistant member and a second movable member;

FIG. 5 illustrates a section according to C-C in FIG. 4;

FIG. 6 shows, in five different positions, an alternative embodiment of the connection between an elongate buckling resistant member and a second movable member;

DETAILED DESCRIPTION OF THE ILLUSTRATIVE EMBODIMENTS

Figure 1:
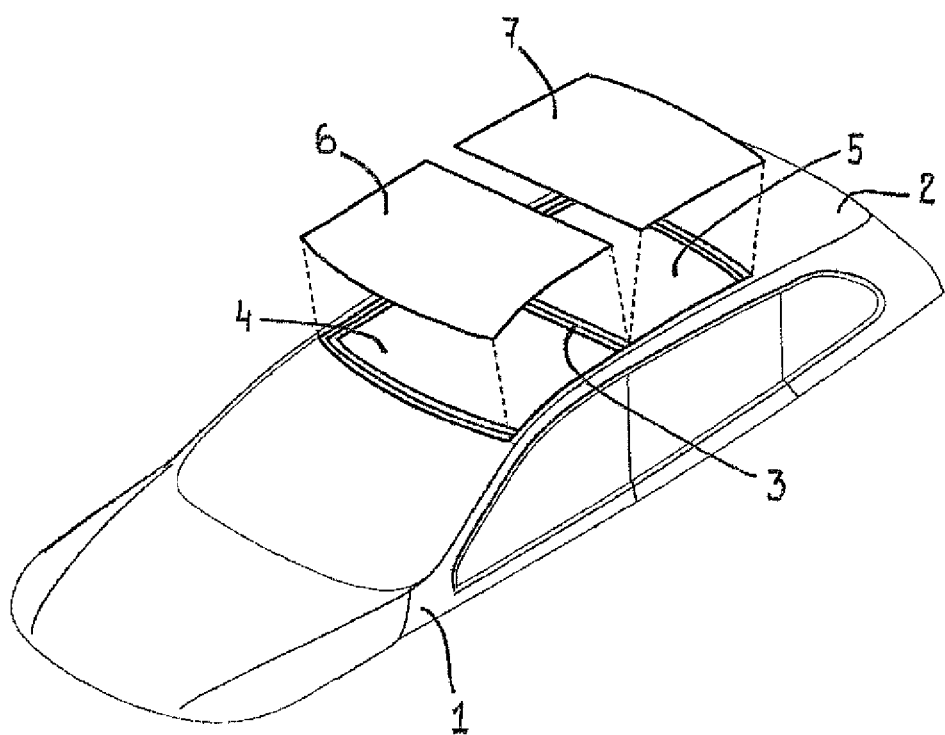
FIG. 1 shows, in a perspective view and schematically, part of a vehicle with an embodiment of an open roof construction.

Firstly referring to FIG. 1, an open roof construction for a vehicle 1 is illustrated. It comprises a stationary roof part 2 and a roof opening provided therein. In said roof opening a transverse beam 3 is provided which is attached to (or forms an integral part of) the vehicle body and extends between opposite longitudinal sides of the roof opening for dividing the roof opening in a first, forward roof opening 4 and a second, rearward roof opening 5.

The first and second roof openings 4,5 are provided with first and second roof modules 6,7, respectively, which may have any appropriate design. As will appear below, each roof module comprises a movable member 13,18 which is movable in the longitudinal direction of the vehicle, wherein the first roof module 6 further is provided with a drive source for moving its respective movable member.

Such roof modules 6,7 will be mounted into (or dismounted from) the respective roof openings 4,5 in a vertical manner, as has been represented schematically by dotted lines in FIG. 1.

FIG. 2a schematically illustrates a top plan view of an embodiment of the open roof construction. The outline of the first roof module 6 and part of the outline of the second roof module 7 have been illustrated in dotted lines, as well as their relative positions with respect to the transverse beam 3. It is noted, that in the FIGS. 2b-f such outlines have not been represented.

In the embodiment according to FIGS. 2a-f the drive source of the first roof module 6 comprises an electric motor 8 which through a gear 9 drives two push-pull cables 10,11. First ends of said cables 10,11 are connected to a drive member 12 for the movable member 13 of the first roof module 6 (which, in this case, is a pull beam 12 for a flexible screen 13 of a rollo which can be wound on or off a winding shaft 14). Second ends of the cables 10,11 (so called run-outs) extend each in a respective one of two opposite longitudinal cable guides 15,16, in such a manner that, when the drive member 12 moves, the first and second ends of a push-pull cable 10,11 move in opposite longitudinal directions.

The second roof module 7 likewise comprises a drive member 17 for a movable member 18 (which, in the illustrated embodiment, also comprises a pull beam 17 for a flexible screen 18 of a rollo which can be wound on or off a winding shaft 19) which at opposite ends is guided in two opposite longitudinal guide members 20, 21.

As is known per se, the winding shafts 14,19 may be spring-loaded in a direction for winding on the respective screens 13, 18 (and thus, in the present embodiment, for moving the drive members 12,17 towards the transverse beam 3), defining an open position of the respective modules.

The open roof construction further is provided with two elongate buckling resistant members 22,23 extending substantially longitudinally and capable of operatively connecting the drive source (electric motor 8 with push-pull cables 10,11) of the drive member 12 of the first roof module 6 with the drive member 17 of the second roof module 7.

The elongate buckling resistant members 22,23 define members which can withstand longitudinal compression forces without substantially deforming (buckling or bending). For example, such elongate buckling resistant members 22,23 may comprise rods or tubes of an appropriate material with sufficient rigidity. This means that such members 22,23 may withstand such compression forces without being supported over a substantial part of their length.

In an inoperative, mounting or dismounting position of the open roof construction (FIG. 2a) the elongate buckling resistant members 22,23 are receivable within a respective one of the cable guides 15,16. This means, that in such an inoperative position the elongate buckling resistant members 22,23 do not protrude that far from the first roof module 6 that they will interfere with the (edges of) the roof openings and that the vertical mounting and dismounting of both roof modules 6,7 (as illustrated schematically in FIG. 1 by dotted lines) can be carried out.

In an operative position of the open roof construction (illustrated in FIGS. 2c-f) first ends of the elongate buckling resistant members 22,23 are received in said cable guides 15,16 to be engageable by said second ends of the push-pull cables 10,11 and second ends are received in respective ones of the two opposite longitudinal guide members 20,21 for the drive member 17 of the second roof module 7 (which, therefore, generally will extend substantially in line with the cable guides 15,16). This means that the elongate buckling resistant members 22,23, in said operative position of the open roof construction, extend longitudinally fully across the transverse beam 3. Or, in other words, each elongate buckling resistant member 22,23 comprises two opposite ends which, in said operative position, are located outside the transverse beam 3 as considered in a longitudinal direction (and in the respective cable guide and guide member, respectively).

FIG. 2g shows, one above the other, two different embodiments in the inoperative position of the open roof construction in a cross section according to A-A in FIG. 2a. Likewise, FIG. 2h shows, one above the other, said two different embodiments in the operative position of the open roof construction in a cross section according to B-B in FIG. 2c. In the lower embodiment the transverse beam 3, for the passage of each of the elongate buckling resistant members 22,23, is provided with holes 24 with a diameter sufficiently large to always prevent contact between the transverse beam 3 and a respective elongate buckling resistant member 22,23 (in the operative position of the open roof construction).

In the upper embodiment the position and height of the transverse beam 3 are such that, in the operative position, the elongate buckling resistant members 22,23 will extend below the transverse beam as illustrated in FIGS. 2g and 2h. The elongated buckling resistant members 22,23 are illustrated extending above the transverse beam as illustrated in FIGS. 2i and 2j.

Figure 2:
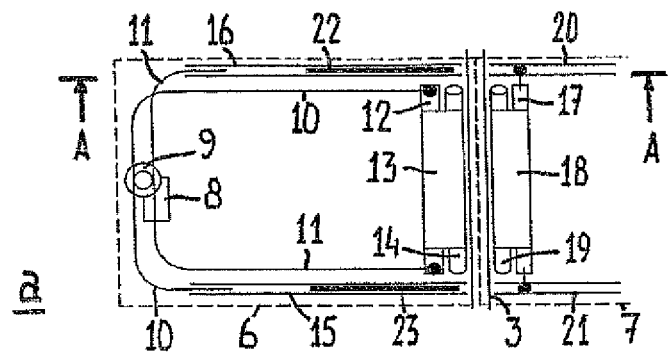
FIG. 2 illustrates, schematically in a number of different positions and in two different views, a first and second embodiment of the open roof construction.
Figure 2:
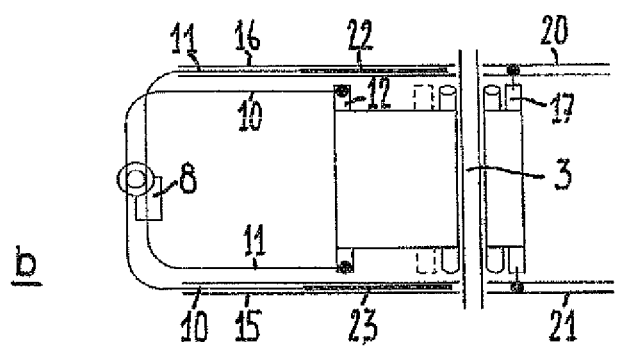
Figure 2:
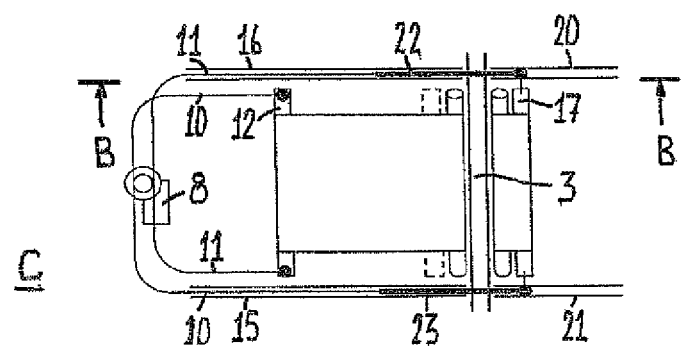
Figure 2:
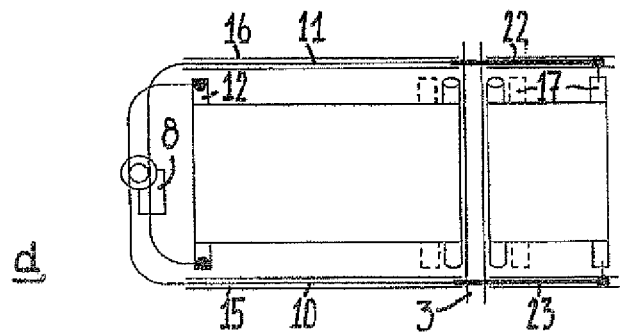
Figure 2:
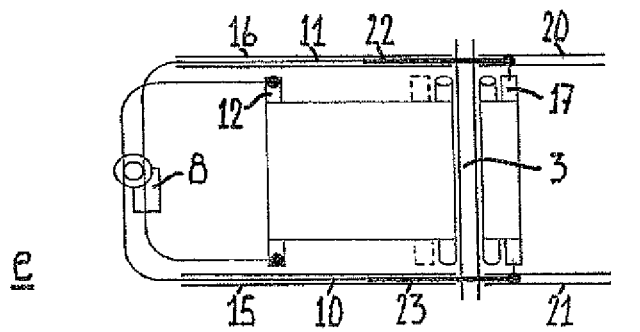
Figure 2:
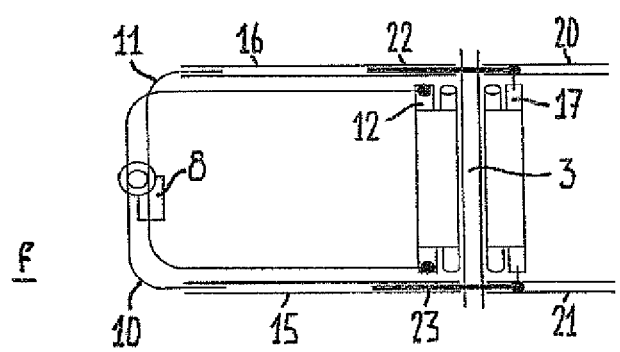
Figure 2:
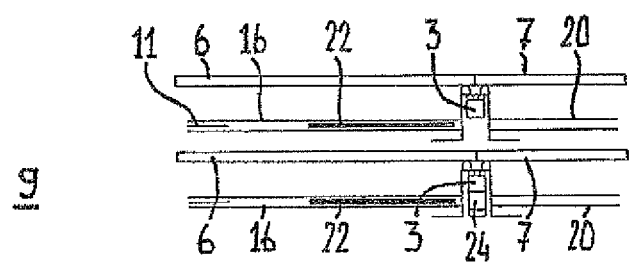
Figure 2:
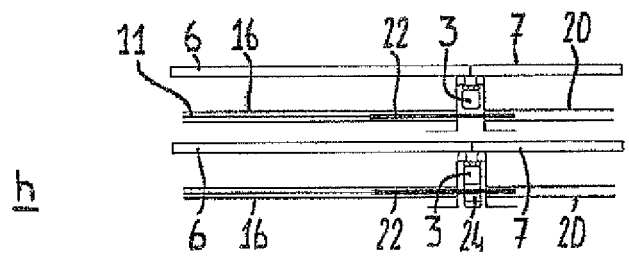
Figure 2:
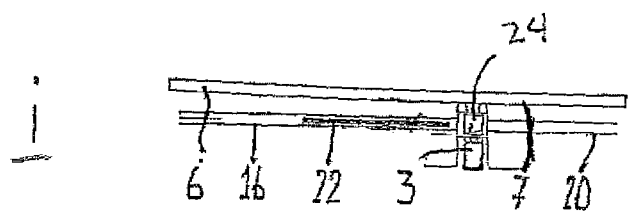
Figure 2:

In the embodiment according to FIG. 2 the elongate buckling resistant members 22,23 are disconnectable from the drive member 17 of the second roof module 7 such that, as stated before, the opposite longitudinal cable guides 15,16 of the first roof module 6, in an inoperative, mounting or dismounting position of the open roof construction, are able to fully receive the elongate buckling resistant members 22,23.

For mounting or dismounting the first and second roof modules 6,7, the elongate buckling resistant members 22,23 are disconnected from the drive member 17 and received in the cable guides 15,16 as illustrated in FIG. 2a. The drive members 12 and 17 are in an (open) rest position (screens 13,18 maximally wound onto the respective winding shafts 14,19) and the push-pull cables 10,11 are fully retracted into the cable guides 15,16 by the electric motor 8, and their second ends are free from the elongate buckling resistant members 22,23.

After mounting has been completed (roof modules 6,7 positioned into roof openings 4,5), the electric motor 8 moves push-pull cables 10,11 with their second ends into engagement with the elongate buckling resistant members 22,23 while the first ends of said cables 10,11 move the drive member 12 with screen 3 towards a partially extended (partially closed) position (FIG. 2b). During this initial stage the drive member 17 of the second roof module 7 remains stationary.

Further moving the cables 10,11 leads to a corresponding movement of the elongate buckling resistant members 22,23 until these will engage the drive member 17 of the second roof module 7 (FIG. 2c). Such an engagement generally will lead to a connection between the elongate buckling resistant members 22,23 and the drive member 17, as will be elucidated below while referring to FIGS. 4 and 5.

During a further movement of the cables 10,11 with the elongate buckling resistant members 22,23 (and, of course, of the first drive member 12), the second drive member 17 will move along towards the position illustrated in FIG. 2d which could be an end position (both screens 13 and 18 fully closed) of the open roof construction.

Starting from the situation in FIG. 2d, reversing the drive direction of the electric motor 8 firstly will lead to the situation in FIG. 2e (which corresponds with FIG. 2c) in which the screen 18 is again fully opened and the drive member 17 has reached its extreme position near to the transverse beam 3. Further moving the cables 10,11 will yield the situation shown in FIG. 2f which partly corresponds with the situation in FIG. 2b, but in which the elongate buckling resistant members 22,23 are still connected to the second drive member 17 and still bridge the transverse beam 3. Thus, once the elongate buckling resistant members 22,23 have been connected with the second drive member 17, they will keep extending fully across the transverse beam 3 in all operational positions of the open roof construction.

For dismounting purposes the second ends of elongate buckling resistant members 22,23 should be disconnected again from the drive member 17 and the situation illustrated in FIG. 2a should be restored in which the elongate buckling resistant members 22,23 again are fully received in the cable guides 15,16.

Figure 3:
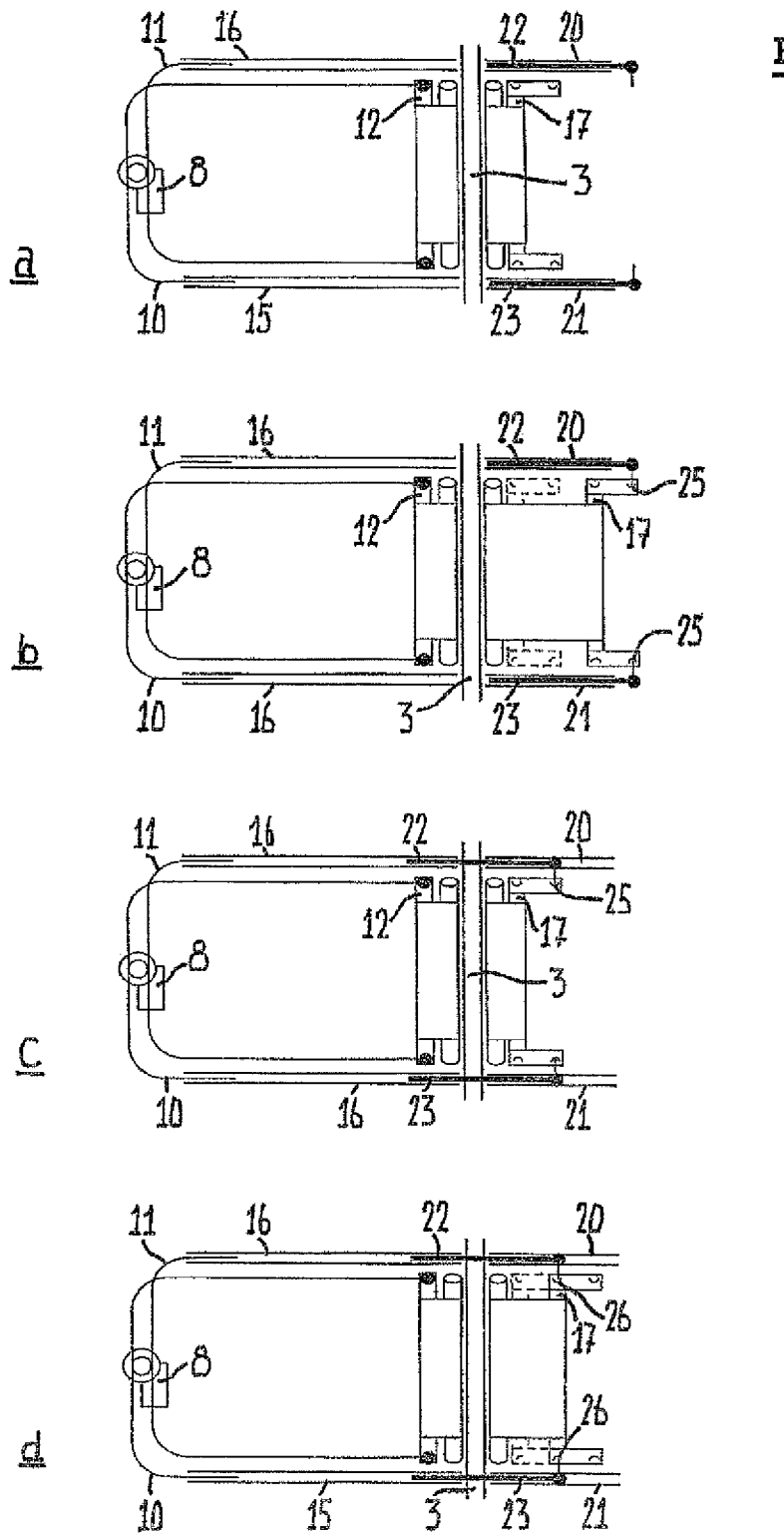
FIG. 3 illustrates, schematically in a top plan view and in a number of different positions, a third embodiment of the open roof construction.
Figure 3:
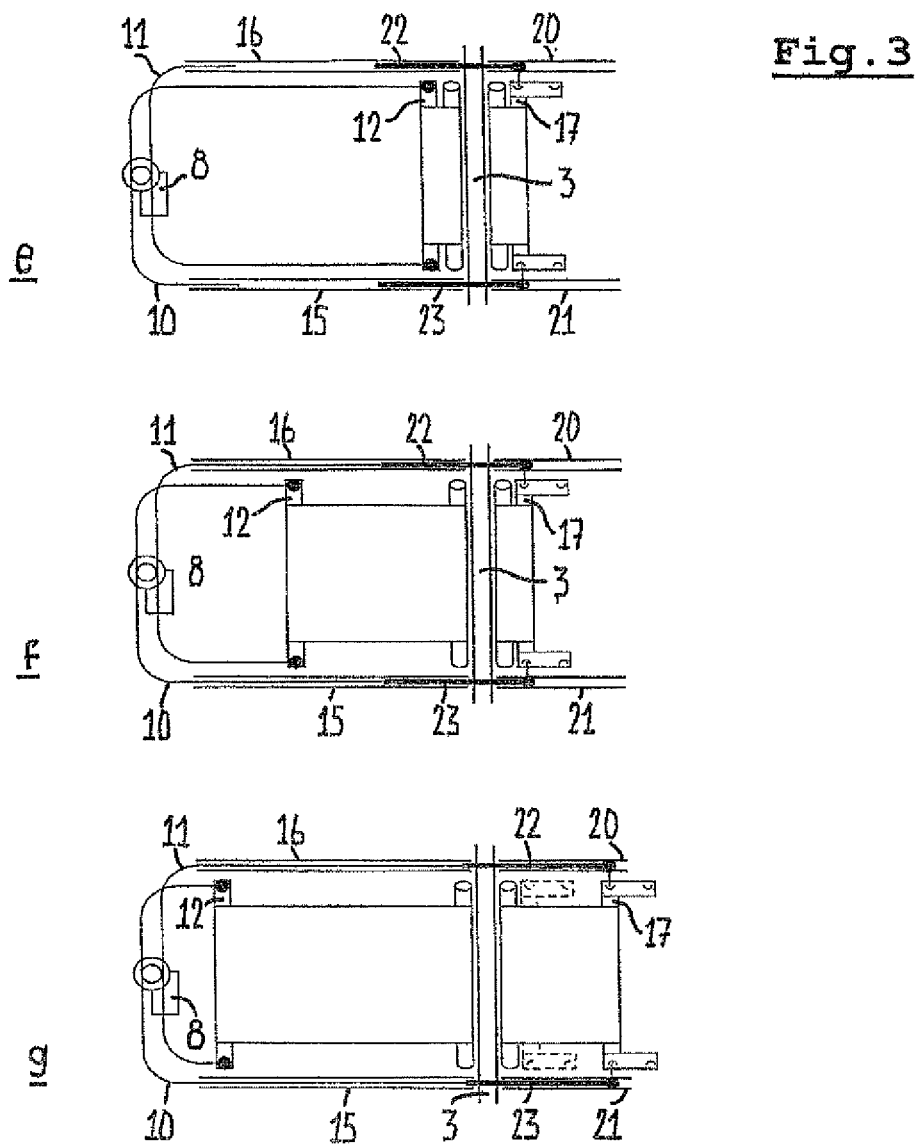

The embodiment illustrated in FIG. 3 basically operates in a similar manner, once the elongate buckling resistant members 22,23 are properly connected to the second drive member 17 (FIGS. 3e-g). However, initially (in the inoperative, mounting or dismounting position of the open roof construction) as illustrated in FIG. 3a the elongate buckling resistant members 22,23 are disconnected from the drive member 17 of the second roof module 7 and the two opposite longitudinal guide members 20,21 of the second roof module 7 receive said elongate buckling resistant members.

A special feature of the embodiment illustrated in FIG. 3 is, that the elongate buckling resistant members 22,23 are connectable to the drive member 17 of the second module 7 in at least two different longitudinal positions. The first position is shown in FIG. 3b, which is achieved by (manually) moving the drive member 17 to the right (to a position which generally is an extreme position of the drive member). In this situation the elongate buckling resistant members 22,23 engage first (temporary) connectors 25 of the drive member 17.

Next the drive member 17 is moved back to the left together with the elongate buckling resistant members 22,23 towards the position illustrated in FIG. 3c and the elongate buckling resistant members 22,23 are kept in this position while the drive member 17 is moved a little bit further to the right, such that the elongate buckling resistant members 22,23 will engage (final) connectors 26 of the drive member 17 (FIG. 3d).

This two stage connection process of the elongate buckling resistant members 22,23 with the drive member 17 ensures that in all operational positions (FIGS. 3e-g) the elongate buckling resistant members 22,23 remain in positions fully bridging the transverse beam 3 (in other words, positions in which the opposite ends of the elongate buckling resistant members 22,23 remain in the cable guides 15,16 and in the guide members 20,21).

It is noted that it is also possible to arrive at the position according to FIG. 3d directly from the position according to FIG. 3b (keeping the drive member 17 stationary and moving the elongate buckling resistant members 22,23 further to the left for engaging the connectors 26).

FIG. 3e shows the operational (mounted) position of the open roof construction with both screens 13,18 fully open. FIG. 3f shows the moment on which the first screen 13 is partially closed and the second screen 18 starts moving because the push-pull cables 10,11 have just engaged the elongate buckling resistant members 22,23 (which are connected to the second drive member 17). Finally FIG. 3g shows the situation in which the screens of both roof modules are in a fully closed position.

Each elongate buckling resistant member 22,23 may be connectable to the drive member 17 of the second roof module 7 through snap connections. FIG. 4 illustrates an example of a snap connection 27 which may be used in the embodiment according to FIG. 2 (FIG. 4a disengaged and FIG. 4b engaged). FIG. 5 shows, on a larger scale, a cross section of said snap connection 27 according to C-C in FIG. 4b.

FIG. 6 shows an example of an embodiment of a two stage snap connection for use in the embodiment according to FIG. 3 with temporary snap connectors 25 and final snap connectors 26. Basically, the positions of FIGS. 6a-c correspond with the positions of FIGS. 3a-c, FIG. 6d corresponds with FIG. 3d, full lines and FIG. 6e corresponds with FIG. 3e.

Figure 7:
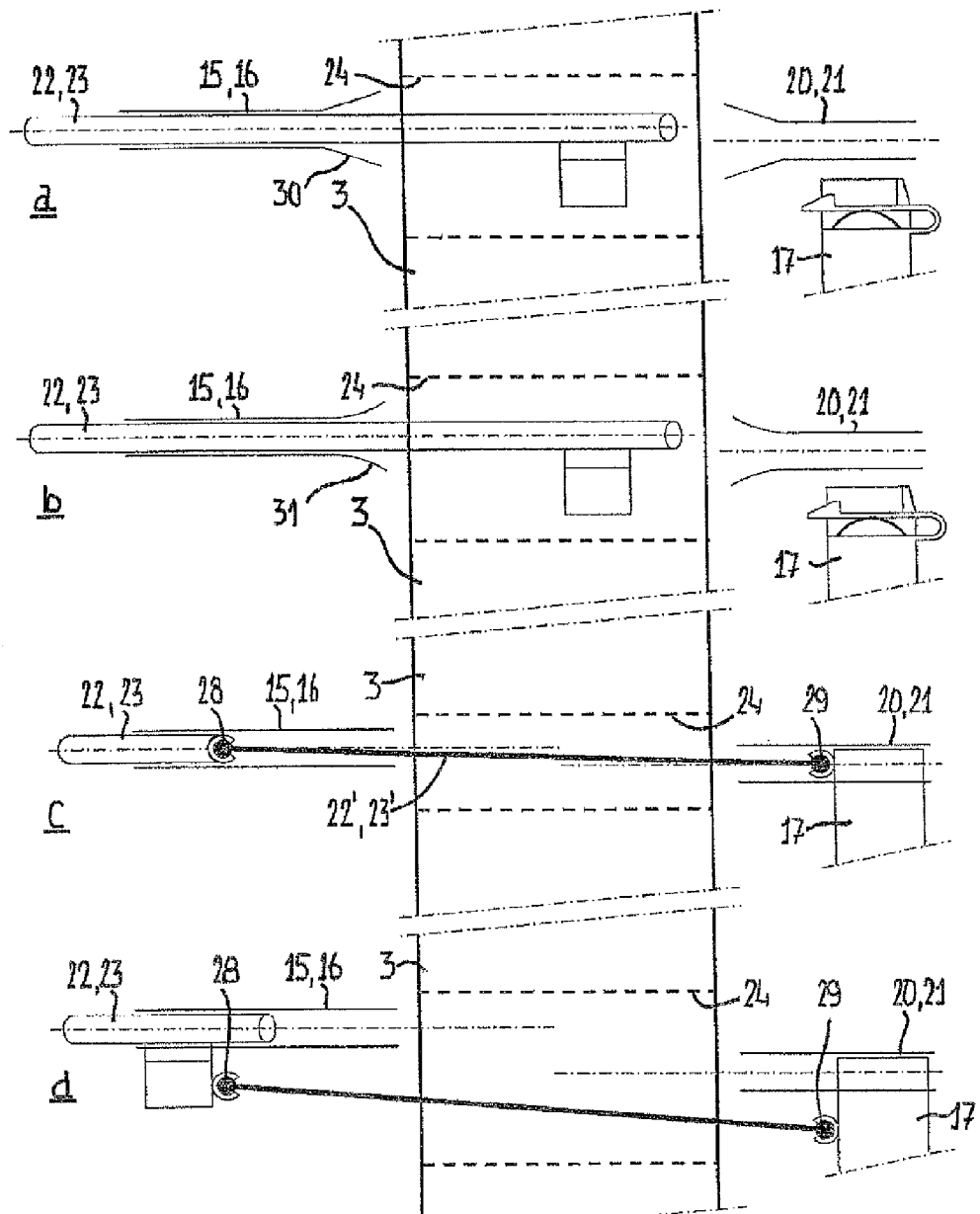
FIG. 7 illustrates, in four different embodiments, a detail of the open roof construction.

Next, reference is made to FIG. 7. FIGS. 7a and 7b illustrate embodiments in which the facing ends of corresponding ones of the opposite longitudinal cable guides 15,16 and opposite longitudinal guide members 20,21 of the first and second roof modules 6,7, respectively, are flared. In FIG. 7a this flare 30 is straight, in FIG. 7b this flare 31 is curved. Such a flare allows an easy introduction of the elongate buckling resistant members 22,23 into the cable guides 15,16 and guide members 20,21 during mounting. However, it is possible too to provide guide channels in the beam 3 for guiding the members 22,23 during mounting.

In FIGS. 7c and 7d each elongate buckling resistant member 22,23 comprises a part 22',23' with reduced diameter which by means of a first hinge member 28 is connected to the remainder of said elongate buckling resistant member 22,23 and which by means of a second hinge member 29 is connectable to the drive member 17 of the second roof module 7. The first and second hinge members 28,29 may define ball hinges. In FIG. 7c the part 22',23' with one end is positioned in a cable guide 15,16 and with the other end in a guide member 20,21. In FIG. 7d these ends are positioned outside the cable guide and guide member. These parts 22',23' enable coping with misalignments between the cable guides 15,16 and corresponding guide members 20,21.

It is noted that the drive members may also comprise other components than the pull beams 12 and 17. For example, such drive members may comprise slides and/or levers cooperating with guides for achieving the desired movements of the movable means (for example roof panel or panels). When the movable means comprises two movable members (such as panels), each movable member may comprise a number of drive members.

Figure 8:
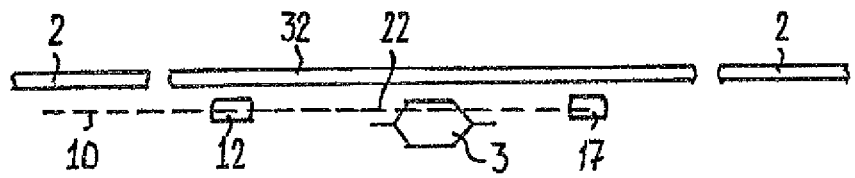
FIG. 8 shows part of a schematic side elevational view of another embodiment.
Figure 9:
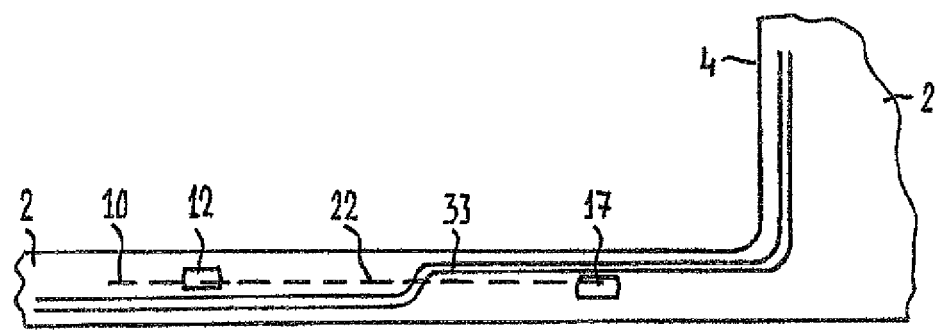
FIG. 9 shows part of a schematic top plan view of yet another embodiment.
Figure 10:
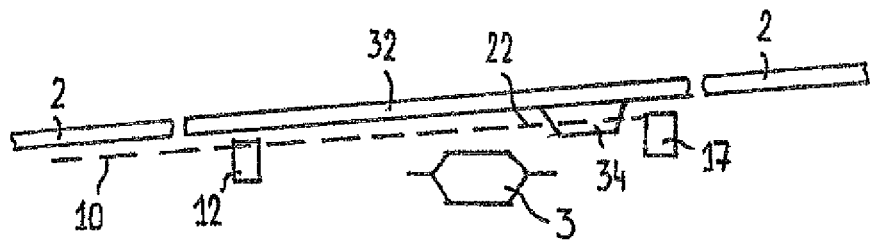
FIG. 10 shows part of a schematic side elevational view of yet another embodiment.

Finally reference is made to FIGS. 8-10 which show alternative embodiments of an open roof construction to which the aspects of the present invention are applicable.

FIG. 8 shows a schematic side elevational view of an embodiment which basically corresponds with the embodiment according to FIG. 2 (and of which only the parts for understanding the differences therewith have been shown), however used for a single movable panel 32 (and not for two movable members 13 and 18) cooperating with two drive members 12 and 17 at opposite sides of a transverse beam 3. Between the drive members 12 and 17 a buckling resistant member 22 (which may comprise a push-pull cable, as also may apply for other embodiments described herein) has been illustrated schematically by a dotted line extending across beam 3, which applies too for a push-pull cable 10 driving the drive member 12.

FIG. 9 shows part of a schematic top plan view of an embodiment of which a first (or only) roof opening 4 is visible which is surrounded by a wall 33 (or frame made of plastic and/or metal) here defining a water barrier or acting as a support for a seal member. At opposite sides of a central shaped part of said wall first and second drive members 12 and 17 are located (cooperating with one or two panels, not visible here). A buckling resistant member 22 has been illustrated schematically by a dotted line extending across wall 33, which applies too for a push-pull cable 10 driving the drive member 12. For an explanation of the operation of such an embodiment again reference may be made to the above description of FIG. 2.

Finally FIG. 10 shows a schematic side elevational view of an embodiment which also basically corresponds with the embodiment according to FIG. 2 (and of which only the parts for understanding the differences therewith have been shown), however again used for a single movable panel 32 cooperating with two drive members 12 and 17 at opposite sides of a transverse beam 3. In this embodiment, however, the two drive members 12 and 17 are positioned at opposite sides of a reinforcing beam 34 which is part of the panel 32. Between the drive members 12 and 17 a buckling resistant member 22 has been illustrated schematically by a dotted line extending across beam 34, which applies too for a push-pull cable 10 driving the drive member 12. Also here, for an explanation of the operation of such an embodiment reference may be made to the above description of FIG. 2.

The invention is not limited to the embodiments described above which may be varied widely within the scope of the invention as defined by the appending claims. As such, any reference to a longitudinal direction may also be replaced by a reference to a transverse direction and vice versa.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle having a roof opening provided in a stationary roof part of the vehicle, comprising:
   at least one movable member configured to open and close the roof opening,
   at least a first and second drive member connected to the at least one movable member, the first and second drive members being movable in a direction of the vehicle and are spaced apart in said direction by a free space,
   at least one elongate buckling resistant member extending substantially in said direction and movable between a disconnect position in which the at least one elongate buckling resistant member assumes a position for not entirely spanning the free space and the first and second drive members of the at least one movable member are operatively disconnected from each other such that the first and second drive members are independently movable relative to each other and a connect position where the at least one elongated buckling resistant member spans the free space and the first and second drive members of the at least one movable member are connected such that the movement of the first and second drive members is simultaneous, and a common drive operably coupled to move the at least one elongate buckling resistant member.

2. The open roof construction according to claim 1, wherein the at least one movable member comprises separate first and second movable members cooperating with the first and second drive members, respectively.

3. The open roof construction according to claim 1, wherein the at least one movable member comprise a single movable member cooperating with both the first and second drive members.

4. The open roof construction according to claim 2, wherein the roof opening is provided with at least one constructional part positioned between the first and second drive members with first and second roof modules at opposite sides of said constructional part, as seen in said direction of the vehicle, and wherein the at least one elongate buckling resistant member in an operative position of the open roof construction extends in said direction fully across said constructional part.

5. The open roof construction according to claim 4, wherein said constructional part comprises a beam extending between opposite sides of the roof opening for dividing the roof opening in a first and a second roof opening, wherein the first and second roof openings are provided with said first and second roof modules, respectively, which are provided with said first and second drive members, respectively, for cooperation with the at least one movable member and wherein the first roof module is provided with the drive source coupled to move the first drive member, whereas the at least one elongate buckling resistant member in an operative position of the open roof construction extends in said direction fully across the beam without contacting the beam and such that the at least one elongated buckling resistant member is supported by the first and second roof modules.

6. The open roof construction according to claim 4, wherein the roof opening comprises a beam extending between opposite sides of the roof opening for dividing the roof opening in a first and a second roof opening, wherein the first and second roof openings are provided with said first and second roof modules, respectively, which are provided with said first and second drive members, respectively, for cooperation with the at least one movable member and wherein the first roof module is provided with the drive source coupled to move the first drive member, and wherein the constructional part comprises a reinforcement beam provided on the at least one movable member, whereas the at least one elongate buckling resistant member in an operative position of the open roof construction extends in said direction fully across the reinforcement beam.

7. The open roof construction according to claim 4, wherein the roof opening comprises a shaped wall defining the said constructional part, wherein said first and second roof modules are provided with said first and second drive members, respectively, for cooperation with the at least one movable member and wherein the first roof module is provided with the drive source for moving its respective drive member, and wherein the at least one elongate buckling resistant member in an operative position of the open roof construction extends longitudinally fully across the shaped wall.

8. The open roof construction according to claim 5, wherein in an inoperative, mounting or dismounting position of the open roof construction the at least one elongate buckling resistant member is receivable within one of the first and second roof modules in such a manner that it will not interfere with the respective roof opening during mounting or dismounting.

9. The open roof construction according to claim 5, wherein the constructional part for the passage of each elongate buckling resistant member, is provided with a hole with a diameter sufficiently large to prevent contact between the constructional part and the elongate buckling resistant member during normal operation.

10. The open roof construction according to claim 5, wherein the position and height of the constructional part are such that the at least one elongate buckling resistant member extends there below or above without engaging it.

11. The open roof construction according to claim 5, wherein the drive source of the first roof module comprises two push-pull cables which are connected to the drive member of the first roof module, and which extend each in a respective one of two opposite cable guides of said first roof module, and wherein two elongate buckling resistant members are provided of which, in the operative position of the open roof construction, first ends are received in said cable guides to be engageable by said push-pull cables when said push-pull cables drive said drive member, and of which, in said operative position, second ends are received in respective ones of two opposite guide members for the drive member of the second roof module which extend substantially in line with the cable guides.

12. The open roof construction according to claim 11, comprising two push-pull cables of which first ends are connected to the drive member of the first roof module, and of which second ends extend each in a respective one of the two opposite cable guides of said first roof module, in such a manner that, when said drive member moves, the first and second ends of a push-pull cable move in opposite directions, and wherein the first ends of the two elongate buckling resistant members, in the operative position of the open roof construction, are received in said cable guides to be engageable by said second ends of the push-pull cables.

13. The open roof construction according to claim 11, wherein the elongate buckling resistant members are disconnectable from the second drive member of the second roof module and wherein the opposite cable guides of the first roof module, in an inoperative, mounting or dismounting position of the open roof construction, are able to fully receive the elongate buckling resistant members.

14. The open roof construction according to claim 11, wherein the elongate buckling resistant members are disconnectable from the second drive member of the second roof module and wherein the two opposite guide members of the second roof module, in an inoperative, mounting or dismounting position of the open roof construction, are able to fully receive the elongate buckling resistant members.

15. The open roof construction according to claim 14, wherein the elongate buckling resistant members are connectable to the second drive member of the second module in at least two different positions.

16. The open roof construction according to claim 11, wherein the facing ends of corresponding ones of the opposite cable guides and opposite guide members of the first and second roof modules, respectively, are flared.

17. The open roof construction according to claim 1, wherein the at least one movable member comprises at least one movable roof panel or at least one rollo.

18. The open roof construction according to claim 1, wherein each elongate buckling resistant member comprises a part with reduced diameter which by a first hinge member is connected to the remainder of said elongate buckling resistant member and which by a second hinge member is connectable to a second drive member.

19. The open roof construction according to claim 18, wherein the first and second hinge members comprise ball hinges.

20. The open roof construction according to claim 1, wherein each elongate buckling resistant member is connectable to a second drive member through snap connections.

* * * * *